United States Patent
Driever et al.

(10) Patent No.: US 12,547,561 B2
(45) Date of Patent: Feb. 10, 2026

(54) USING SYSTEM MEMORY TO STORE INITIALIZATION DATA FOR INITIALIZATION OF DEVICES ON A LINK

(71) Applicant: INTERNATIONAL BUSINESS MACHINES CORPORATION, Armonk, NY (US)

(72) Inventors: Patricia G. Driever, Poughkeepsie, NY (US); Marco Kraemer, Sindelfingen (DE); Asha Kiran Bondalakunta, Bangalore (IN); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 18/426,824

(22) Filed: Jan. 30, 2024

(65) Prior Publication Data
US 2025/0245177 A1    Jul. 31, 2025

(51) Int. Cl.
G06F 13/16        (2006.01)
G06F 13/42        (2006.01)

(52) U.S. Cl.
CPC ...... G06F 13/1684 (2013.01); G06F 13/4221 (2013.01); *G06F 2213/0026* (2013.01)

(58) Field of Classification Search
CPC ............. G06F 13/1684; G06F 13/4221; G06F 2213/0026
See application file for complete search history.

(56) References Cited

U.S. PATENT DOCUMENTS

| | | | |
|---|---|---|---|
| 5,003,465 | A | 3/1991 | Chisholm et al. |
| 10,009,423 | B2 | 6/2018 | Craddock et al. |
| 10,009,424 | B2 | 6/2018 | Craddock et al. |
| 10,068,000 | B2 | 9/2018 | Craddock et al. |
| 10,068,001 | B2 | 9/2018 | Craddock et al. |
| 10,133,691 | B2 | 11/2018 | Brewer et al. |

(Continued)

OTHER PUBLICATIONS

"End-to-End Data Access Policies and Guarantees Span Across Stack Components," IP.com, IP.com No. IPCOM000270703D, Aug. 1, 2022, 8 pp.

(Continued)

*Primary Examiner* — Henry Tsai
*Assistant Examiner* — Christopher A Daley
(74) *Attorney, Agent, or Firm* — Konrad, Raynes, Davda & Victor LLP; David Victor (57) ABSTRACT

Provided are a computer program product, system, and method for using system memory to store initialization data for initialization of devices on a link. A link initialization memory area is initialized in a system memory of the first device. A bus address in a bus interface is provided that maps to the link initialization memory area. A first device writes first initialization data to the bus address to cause the first initialization data to be written to the link initialization memory area. A second device writes second initialization data over the bus interface to the bus address to cause the second initialization data to be written to the link initialization memory area. The first device and the second device communicate Input/Output (I/O) requests over the link in response to the writing of the first initialization data and the second initialization data to the link initialization memory area.

20 Claims, 5 Drawing Sheets

(56) References Cited

U.S. PATENT DOCUMENTS

| | | | |
|---|---|---|---|
| 10,229,084 B2* | 3/2019 | Brewer | G06F 13/4022 |
| 10,282,192 B1* | 5/2019 | Ayoub | G06F 8/656 |
| 10,922,068 B1* | 2/2021 | Radjabi | G06F 13/4221 |
| 11,311,801 B2* | 4/2022 | Colenbrander | G06F 9/3877 |
| 2017/0249167 A1* | 8/2017 | Izumi | G06F 3/0685 |
| 2020/0278935 A1 | 9/2020 | Borikar et al. | |

OTHER PUBLICATIONS

"IOQ-Based Differential Security Model for NVMe Storage System," IP.com, IP.com No. IPCOM000265704D, May 7, 2021, 6 pp.

"Method for Improved Inter-Tier Migration Management with NVMe Drives," IP.com, IP.com No. IPCOM000266527D, Jul. 26, 2021, 9 pp.

"Parallel Synchronous Transmission Using GPIO and DMA," St Microelectronics, AN4666 Application Note, Jan. 2016, 30 pp.

"Staged NVMe in a Primary/Secondary Relationship," IP.com, IP.com No. IPCOM000268073D, Dec. 21, 2021, 4 pp.

D. Riedy, et al., "Getting Started with IBM zHyperLink for z/OS," IBM Corporation, IBM Red Paper, Document REDP-5493-01, Apr. 2022, 152 pp.

J. Zhu, et al., "uDMA: An Efficient User-Level DMS for NVMe SSDs," Applied Sciences, 2023, 14 pp.

M.A. Ahmed, et al., "Design and Implementation of a Direct Memory Access Controller for Embedded Applications," IJTech, International Journal of Technology 10(2): 309-319, 2019, 11 pp.

S.K. Singh, "Computer Organization and Architecture," Indian Institute of Information Technology, 2020, 21 pp.

\* cited by examiner

USING SYSTEM MEMORY TO STORE INITIALIZATION DATA FOR INITIALIZATION OF DEVICES ON A LINK

BACKGROUND OF THE INVENTION

1. Field of the Invention

The present invention relates to a computer program product, system, and method for using system memory to store initialization data for initialization of devices on a link.

2. Description of the Related Art

Storage Area Networks (SANs), as described by the Storage Networking Industry Association (SNIA), are high performance networks that enable storage devices and computer systems to communicate with each other over a network. In large enterprises, multiple computer systems, such as servers and hosts, have access to multiple storage controllers, also referred as control units, within the SAN. Typical connections between the host and storage controllers use technologies such as Ethernet or Fibre Channel, with the associated switches, Input/Output (I/O) adapters, device drivers and multiple layers of a protocol stack. Fibre Channel, for example, as defined by the INCITS T11 Committee, defines physical and link layers FC0, FC1, FC2, and FC4 transport layers such as the Fibre Channel Protocol (FCP) for SCSI and FC-SB-6 for Fibre Connectivity (FICON).

The host and storage controller may communicate using synchronous and asynchronous I/O access methods. Synchronous I/O causes a software thread to be blocked while waiting for the I/O to complete, but avoids context switches and interrupts. Synchronous I/O is used when the storage is locally attached and provides with minimal access latency. With asynchronous communication, the host or storage controller may switch context and perform operations while waiting for a response. As access times increase, the non-productive processor overhead in synchronous I/O of waiting for the I/O to complete becomes unacceptable for large multi-processing servers. The current state of the art for server access to SAN storage, with its associated protocol over-head, is to use asynchronous I/O access methods. The large variation in access times, and even the minimum access times, of SAN storage with today's protocols such as Fibre Channel, make synchronous I/O access unacceptable.

A protocol involving synchronous I/O operations across specialized synchronous I/O links has been developed (e.g. the zHyperLink product offered by International Business Machines Corporation), which requires an initialization sequence to exchange the link and storage controller information necessary for authentication and control prior to initiating the synchronous I/O operations. Current state of the art achieves the exchange of such information in a multi-step sequence that places information from each step of the exchange into a set of shared registers available in the underlying hardware implementations.

SUMMARY

Provided are a computer program product, system, and method for using system memory to store initialization data for initialization of devices on a link. A link initialization memory area is initialized in a system memory of the first device. A bus address in a bus interface is provided that maps to the link initialization memory area. A first device writes first initialization data to the bus address to cause the first initialization data to be written to the link initialization memory area. A second device writes second initialization data over the bus interface to the bus address to cause the second initialization data to be written to the link initialization memory area. The first device and the second device communicate Input/Output (I/O) requests over the link in response to the writing of the first initialization data and the second initialization data to the link initialization memory area.

DETAILED DESCRIPTION

Described embodiments provide an improvement of computer technology to perform an initialization sequence for a link, such as a synchronous I/O link, between devices by utilizing the system memory area of one of the devices to store system initialization information. Described embodiments optimize and streamline the initialization exchange of information by utilizing a memory area made accessible to endpoints on both sides of the link. This eliminates dependency on a set of hardware-provided registers in the bus interface components.

To minimize the dependence on registers provided by an underlying hardware implementation, the host or server will initialize a memory area of the system memory that can be read and written by the storage controller endpoint via Direct Memory Access (DMA) operations. The host will initialize a memory of a certain size and allocate portions of this memory to the host and the storage controller. The host area is owned and written by the host. The storage controller area is owned and written by the storage controller. The host will signal the storage controller that DMAs have been enabled to indicate to the storage controller that this memory area is available for fetch and store operations needed for the initialization sequence. This avoids failed DMA operations prior to this point.

Described embodiments reduce the number of exchanges required to complete the link initialization sequence, with both host and storage controller providing all necessary information in one bi-directional exchange that is completed with an acknowledgement. Further, host and storage controller node descriptor information provided during the link initialization sequence to identify the specific type, model and instance of the connected entity may be stored in the host memory space for the initialization information. This information is useful for data capture when problems arise.

Yet further, use of a host system memory to provide the storage for link initialization data allows new data fields to be added for the initialization sequence without the limitations imposed by using hardware memory registers.

Figure 1:
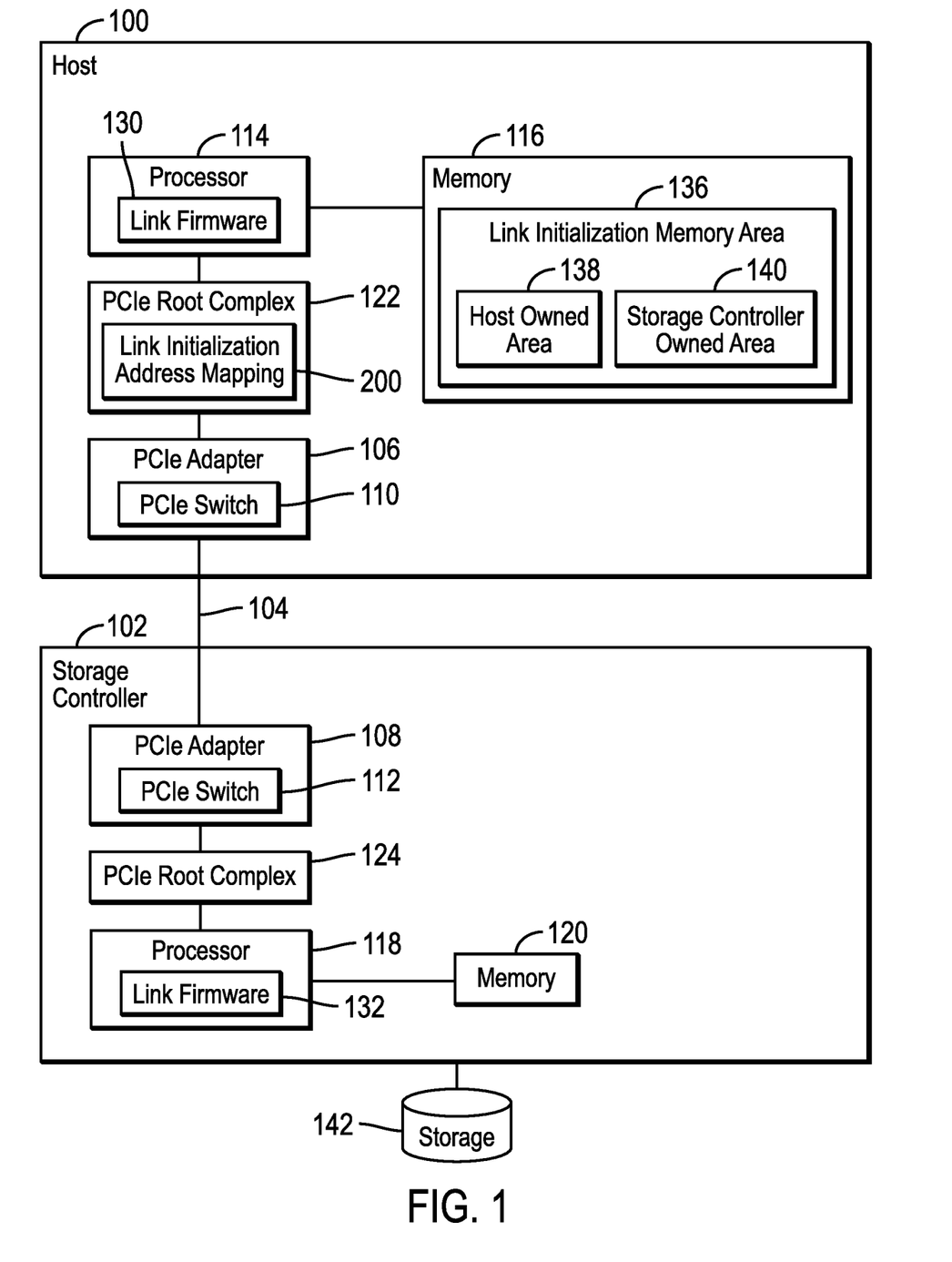
FIG. 1 illustrates an embodiment of a network computing environment.

FIG. 1 illustrates an embodiment of a network computing environment. A host 100 connects to a storage controller 102 over a link between bus adaptors such as a host PCIe adaptor 106 and a storage controller PCIe adaptor 108. The PCIe adaptors 106 and 108 include PCIe switches 110 and 112, respectively. The host 100 includes a processor complex 114 and memory 116 and the storage controller 102 includes a processor complex 118 and memory 120. The host and storage controller PCIe root complexes 122 and 124 connect the processor 114, 118 and memory 116, 120 to the PCIe switches 110 and 112, respectively. The host 100 and storage controller 102 connect over a PCIe link 104, such as a point-to-point cable. The PCIe switches 110, 112 allow the PCIe adaptors 106, 108 to connect to multiple endpoints, in addition to the link 104. PCIe root complexes 122, 124 generate transaction requests for the processors 114, 118, respectively, and may be implemented in a chipset or the processors 114, 118.

Figure 2:
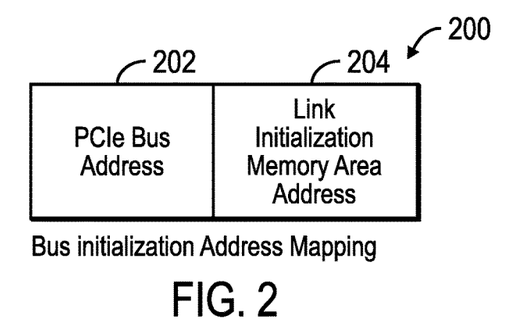
FIG. 2 illustrates an embodiment of a link initialization address mapping.

The host 100 and storage controller 102 processors 114, 118 may also include link firmware 130, 132 to initialize a link between the devices 100, 102. During the initialization sequence, the host link firmware 130 would set a link initialization address mapping 200 in the PCIe root complex 122 to map a PCIe bus address to the link initialization memory area 136 of the host system memory 116. The host and the storage controller PCIe root complexes 122, 124 would use the initialization bus address in the mapping 200 to access the link initialization memory area 136 in the host 100. The PCIe root complexes 122, 124 may DMA read and write to offsets of the PCIe initialization bus address in the mapping 200 to read and write to locations in the link initialization memory area 136 of the host memory 116.

The host link firmware 130 may use the bus address 202 in the mapping 200 to DMA write to the host owned memory area 138 and DMA read from the host 138 and storage controller 140 owned memory areas. The storage controller link firmware 132 may use the bus address 202 in the mapping 200 to DMA write to the storage controller owned memory area 140 and DMA read from the host 138 and storage controller 140 owned memory areas. The host 138 and storage controller 140 owned memory areas are addressed by the PCIe root complexes 122, 124 as offsets from the PCIe initialization bus address.

The host link firmware 130 may initialize the link initialization memory area 136 in the host system memory 116 to include a host owned memory area 138 to which the host 100 writes bus initialization data and a storage controlled owned memory area 140 to which the storage controller 102 writes bus initialization data. The host link firmware 130 would also initialize the link initialization memory area 136 in the host memory 116 with data to start the initialization sequence between the host 100 and the storage controller 102. In this way, the initialization sequence information needed to initialize the link 104 between the host PCIe adaptor 106 and the storage controller PCIe adaptor 108 is maintained in the host system memory 116.

In described embodiments, the host 100 is connected to a storage controller 102 that provides host access to a storage 142 of the storage controller 102. In alternative embodiments, the devices utilizing the link firmware 130, 132 to perform the link initialization sequence may comprise other types of devices than a host and a storage controller, such as a first device and a second device.

In described embodiments, the bus interface comprises a PCIe bus interface. In alternative embodiments, different bus interface technologies, other than PCIe, may be used.

In described embodiments the link firmware 130, 132 is implemented in the processor complexes 114, 118. In alternative embodiments, the link firmware 130, 132 may be implemented in other components and chipsets of the host 100 and storage controller 102. The PCIe root complexes 122, 124 may be implemented in a chipset or hardware of the host 100 and storage controller 102 or implemented within the processor complexes 114, 118, respectively.

In described embodiments, the link firmware 130, 132 is provided to initialize and establish a link for synchronous I/O devices, such as with the IBM zHyperLink technology and with other link technologies. In alternative embodiments, the link may be initialized for other types of I/O operations than synchronous I/O operations.

In certain embodiments, the host 100 may comprise an enterprise host system that includes an operating system such as, but not limited to, the IBM® Z/OS® operating system, the storage controller 192 may comprise an enterprise storage controller, such as the International Business Machines Corporation (IBM®) DS8000™ storage controller or storage controllers from other vendors (IBM, Z/OS and DS800 are registered trademarks of IBM throughout the world).

The memories 116, 120 may comprise suitable volatile or non-volatile memory devices.

FIG. 2 illustrates an embodiment of the link initialization address mapping 200, and includes a PCIe bus address 202 used by the PCIe root complexes 122, 124 to perform link initialization operations over the link 104 and a link initialization memory area address 204 of the link initialization memory area 136 in the host memory 116. The host PCIe root complex 122 translates reads and writes to offsets of the PCIe bus address 202 to offsets of the link initialization memory area address 204 in the link initialization memory area 136 in the host memory 116.

Figure 3:
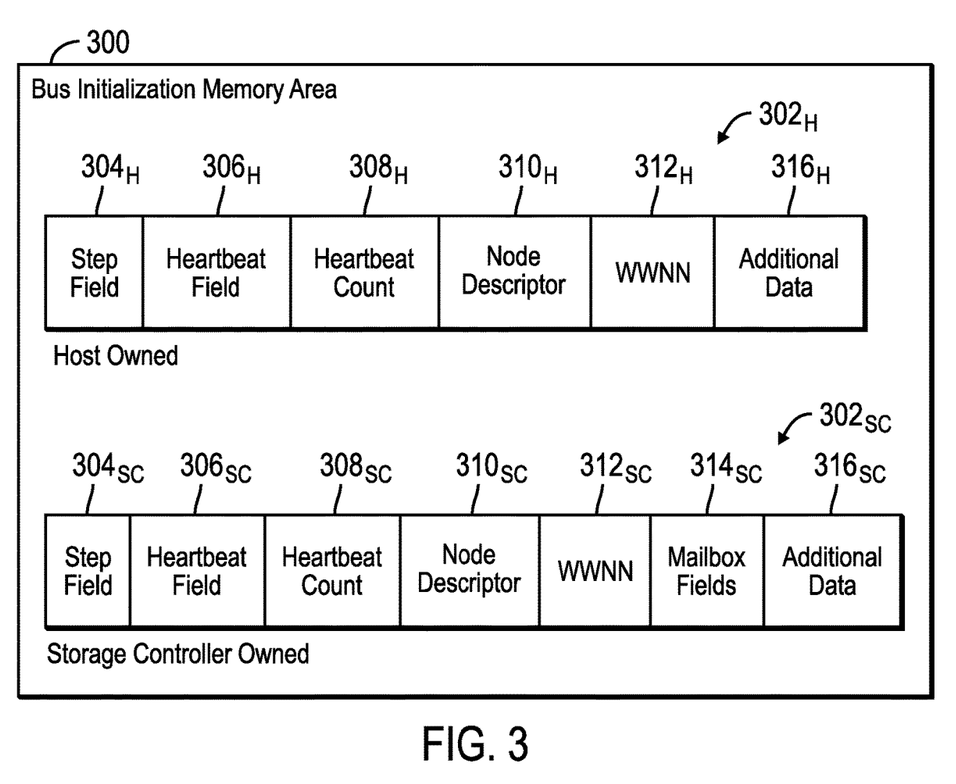
FIG. 3 illustrates an embodiment of a link initialization memory area.

FIG. 3 illustrates an example 300 of the link initialization memory area 136 in the host memory 116, including a host owned area 302H and a storage controller owned area 302sc, which are examples of the host 138 and storage controller 140 owned memory areas of FIG. 2, respectively. The information in each memory area 302H, 302sc may include: a step field 304H, 304sc in which the host and storage controller link firmware 130, 132 may indicate status to signal to the other link firmware 132, 130, respectively, such as data unavailable, handshake complete, data available to read, etc.; a heartbeat field 306H, 306sc in which the host and storage controller link firmware 130, 132 may periodically update with a new heartbeat value indicating they are alive to the other link firmware 132, 130, respectively; a heartbeat count 308H, 308sc indicating how many times the link firmware 130, 132 in a node 100, 102 has determined that the other node 102, 100, respectively, has not updated its heartbeat value in the heartbeat field 306H, 306sc within a heartbeat delay time; and node descriptor fields 310H, 310sc that provide a description of a physical device attached to a serial channel, including a unique worldwide node name 312H, 312sc that is provided to every physical process that can attach to a serial channel to allow the attached components to distinguish from one another. The storage controller owned area 302sc may include mailbox fields 314sc in which the host link firmware 130 can write data to communicate with the storage controller link firmware 132. The host 302H and storage controller 302sc owned areas may include additional data 316H, 316sc, respectively, for additional information and control fields.

Figure 4:
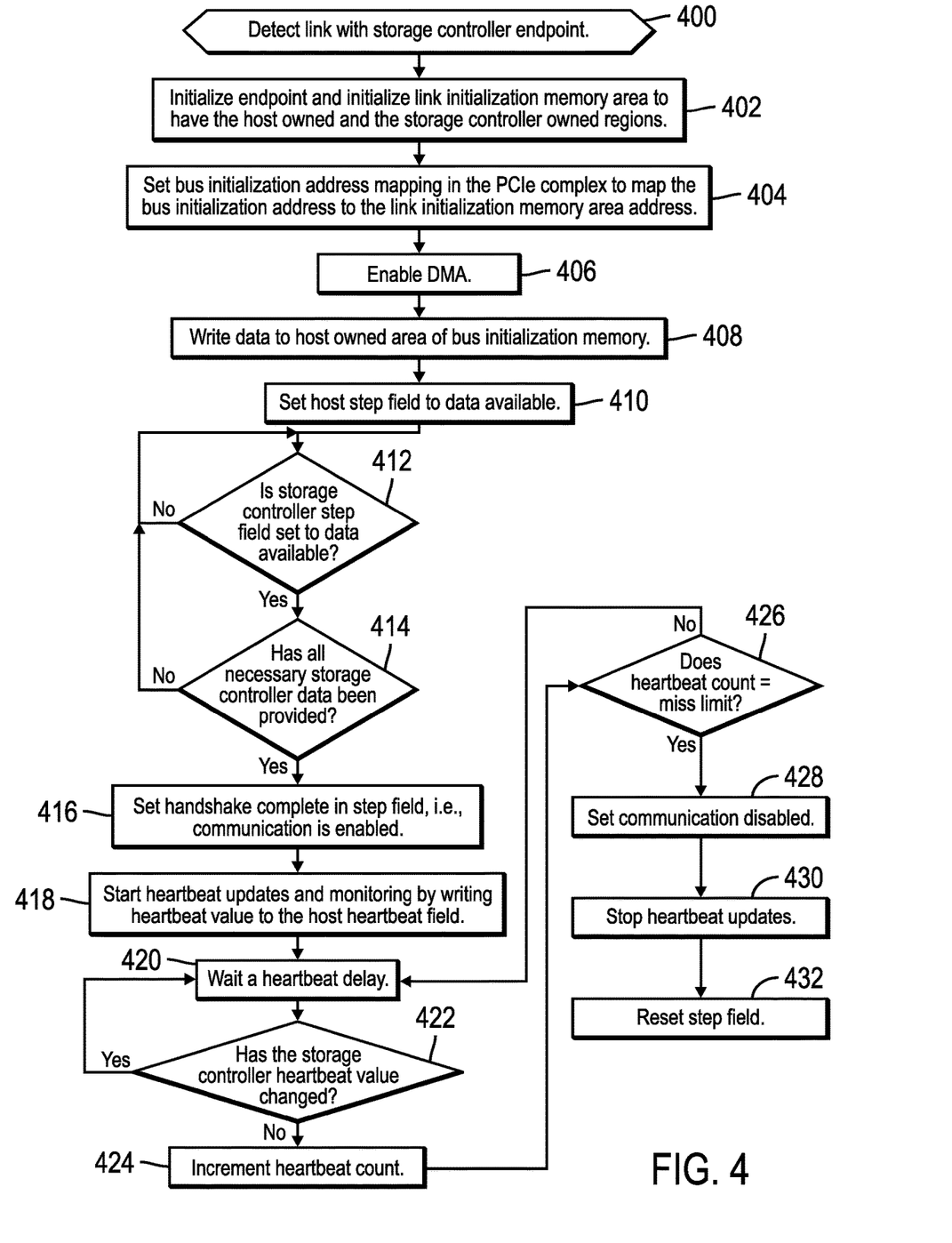
FIG. 4 illustrates an embodiment of operations performed by a host system to initialize a link to communicate with a storage controller.

FIG. 4 illustrates an embodiment of operations performed by the host link firmware 130 as part of the link initialization process that utilizes the host link initialization memory area 136. Upon detecting (at block 400) a link with the storage controller 102 as a PCIe endpoint, the host link firmware 130 initializes (at block 402) the endpoint and initializes the link initialization memory area 136 to have the host owned 138 and the storage controller owned 140 memory areas. The host link firmware 130 sets (at block 404) the link initialization address mapping 200 in the host PCIe complex 122 to map a fixed PCIe bus address 202 to a link initialization memory area address 204, where the link initialization memory area 136 is located in the host system memory 116. The host owned area 138 and the storage controller owned area 140 are at offsets from the PCIe bus address 202 and the link initialization memory area address 204. The host link firmware 130 enables (at block 406) DMA access to the host memory 116, which signals to the storage controller link firmware 132 that the host link initialization memory area 136 is available for DMA fetch and store operations needed for the initialization sequence.

The host link firmware 130 writes (at block 408) initialization data into the host owned area 138 of the link initialization memory area 136, such as writing host information to the node descriptor 310H and any other fields, such as the physical channel port location (PCHID), WWNNN 312H and other fields of the host owned area 302H. After completing writing the host information necessary for synchronization operations, the host step field 304H is set (at block 410) to "data available" to indicate to the storage controller link firmware 132 to proceed. If (at block 412) the storage controller step field 304sc indicates that data is available, which means the storage controller link firmware 132 has written host 102 information needed for synchronization, and if (at block 414) all necessary storage controller 102 data in the storage controller owned area 302sc has been written, then the storage controller link firmware 132 sets (at block 416) "handshake complete" in the step field 304H indicating that communication is enabled and can proceed. If (at block 412) the storage controller step field 304sc does not indicate data available or if (at block 414) the storage controller link firmware 132 has not provided all necessary data to proceed, then control proceeds back to block 412 to wait for the storage controller step field 304sc to indicate data is available and the storage controller 102 is ready to proceed.

The host link firmware 130 starts (at block 418) heartbeat updates and monitoring by writing a heartbeat value to the host heartbeat field 306H. After waiting (at block 420) a heartbeat delay time, the host link firmware 130 determines (at block 422) whether the storage controller heartbeat value 306sc has changed, i.e., been updated by the storage controller 102. If (at block 422) the value 306sc has changed, control proceeds back to block 420 to wait a further heartbeat delay until again checking the storage controller heartbeat value 306sc. If (at block 422) the heartbeat value 306sc has not changed, a heartbeat count 308H is incremented (at block 424). If (at block 426) the heartbeat count 308H has reached a miss limit, then communication is disabled (at block 428) and heartbeat updates are stopped (at block 430). The step field 304H is reset (at block 432) to indicate that the connection to the storage controller 102 is not established. If (at block 426) the miss limit is not reached, then control proceeds to block 420 to wait the heartbeat delay to recheck the storage controller heartbeat value 306sc.

Figure 5:
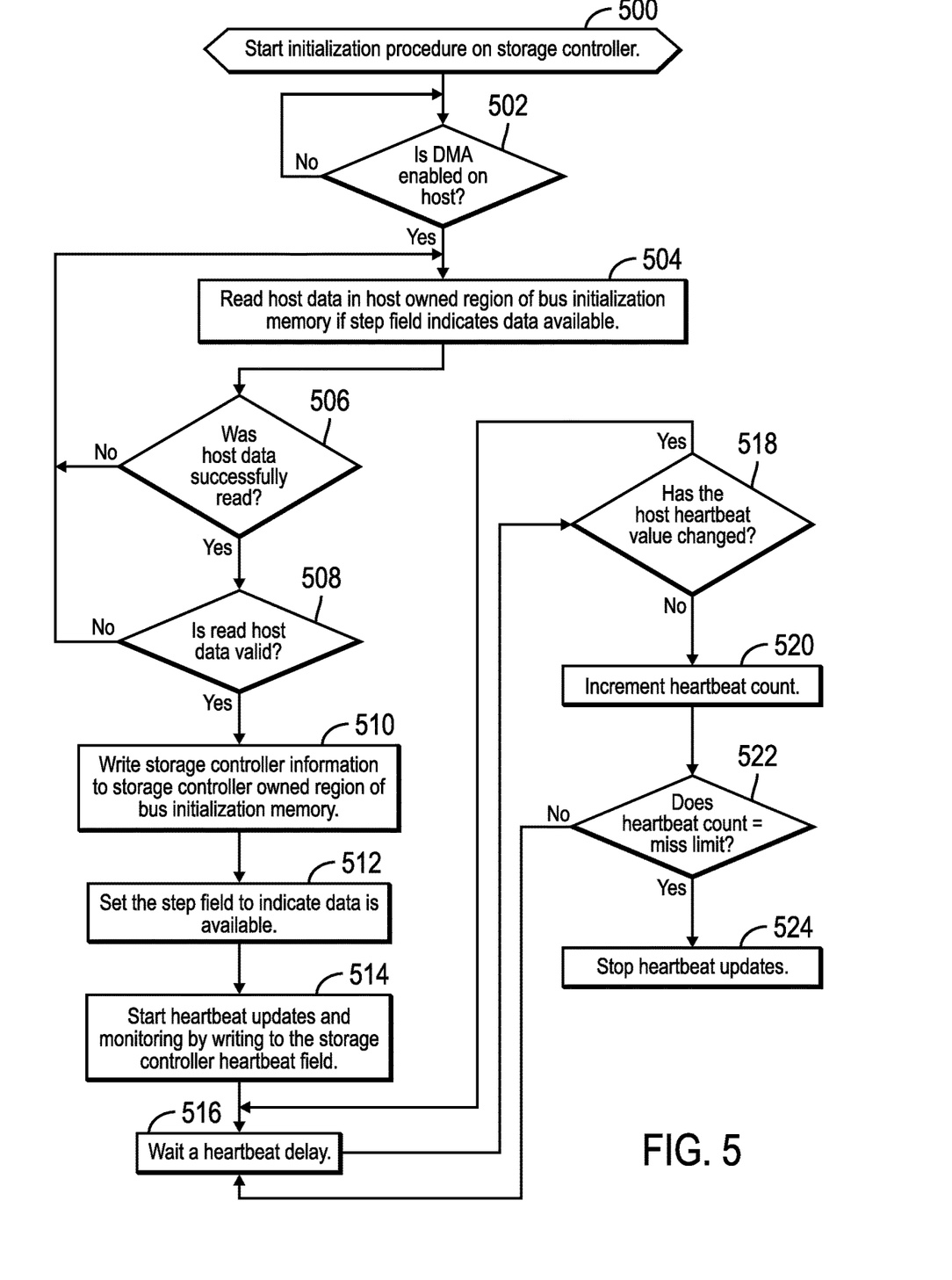
FIG. 5 illustrates an embodiment of operations performed by a storage controller to initialize a link to communicate with a host system.

FIG. 5 illustrates an embodiment of operations performed by the storage controller link firmware 132 as part of the link synchronization process that utilizes the host link initialization memory area 136. Upon starting (at block 500) the link initialization process, the storage controller link firmware 132 determines (at block 502) whether DMA is enabled on the host 100 to allow the storage controller link firmware 132 to send DMA access requests into the host link initialization memory area 136. If (at block 502) DMA is not enabled, then the link firmware 132 waits for DMA to become enabled. If (at block 502) DMA is enabled, then the storage controller link firmware 132 reads (at block 504) the host data in the host owned region 302H of the link initialization memory area 136 if the host step field 304H indicates data is available.

If (at block 506) the host data was not successfully read or if (at block 506) the host data was successfully read but the read data is not valid (at block 508), then the storage controller link firmware 132 proceeds back to block 504 to re-read the host data from the host owned area 302H. If (at block 506 and 508) the host data was read successfully, then the storage controller link firmware 132 writes (at block 510) storage controller information to the storage controller owned area 302sc region of the link initialization memory area 300. After writing, the step field 304sc is updated (at block 512) to indicate data available, which triggers the host link firmware 130 to determine the storage controller data has been provided at block 414 in FIG. 4.

The storage controller link firmware 132 starts (at block 512) heartbeat updates and monitoring by writing a heartbeat value to the storage controller heartbeat field 306sc. After waiting (at block 516) a heartbeat delay time, the storage controller link firmware 132 determines (at block 518) whether the storage controller heartbeat value 306sc has changed. If (at block 518) the value 306sc has changed, then control proceeds back to block 516 to wait a further heartbeat delay. If (at block 518) the heartbeat value 306H has not changed, a storage controller heartbeat count 308sc is incremented (at block 520). If (at block 522) the storage controller heartbeat count 308sc reaches a miss limit, then heartbeat updates are stopped (at block 524). If (at block 522) the heartbeat count 308sc has not reached the miss limit, then control proceeds to block 516 to wait another heartbeat delay.

If the storage controller link firmware 132 has difficulty accessing the link initialization memory area 136, which may be indicated by the unchanged host heartbeat value 306H, then the storage controller link firmware 132 will initiate a new handshake, which should be triggered by the host link firmware 130 at block 428 et seq.

With the embodiment of FIGS. 4 and 5, the host 130 and storage controller 132 link firmware utilize a memory area 136 in the host system memory 116 to store link initialization information to initialize a link between the host 100 and storage controller 102, such as a link for synchronous I/O. In this way, certain initialization information does not need to be stored in PCIe hardware registers, which are limited in size and may require data to be moved out of the registers for other data to be brought in. By storing the initialization information of the host 100 and storage controller 102 in host system memory 116, the information may be maintained without swapping out, and fields may be added and accommodated in the host memory 116 for subsequent versions of the link firmware initialization sequence without being limited by the hardware register configuration of the PCIe bus components. In alternative embodiments, PCIe hardware registers may be used to store certain of the link initialization information in addition to other link initialization information stored in the link initialization memory area 136 in the host system memory 116.

Further, because the link initialization memory area 136 in the host system memory 136 is expandable to accommodate additional information, such as telemetry data, performance indicators, bit error rates, etc. In this way any link information can be passed through the host memory using DMA and avoid using PCIe hardware registers.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
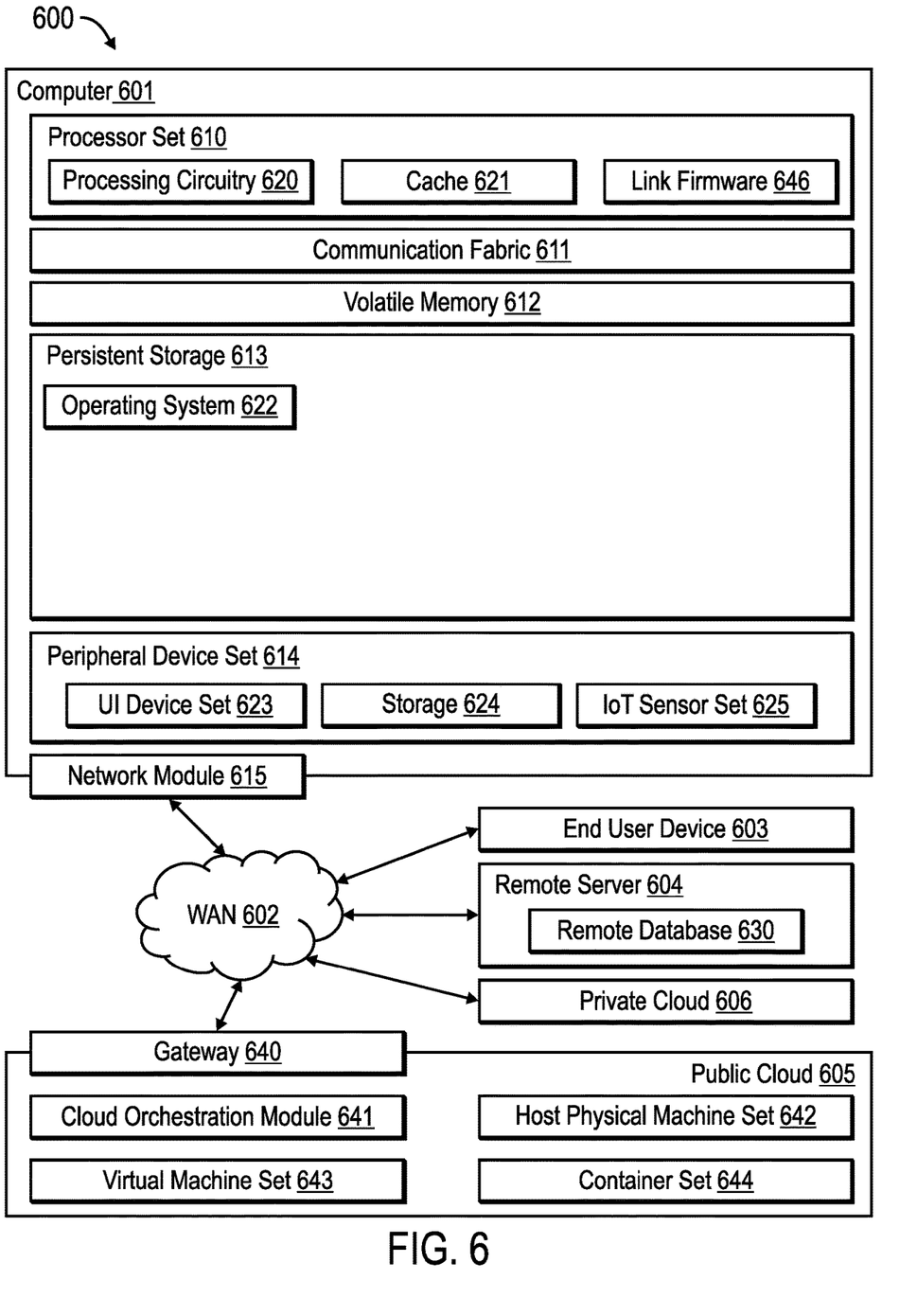
FIG. 6 illustrates a computing environment in which the components of FIG. 1 may be implemented.

With respect to FIG. 6, computing environment 600 contains an example of an environment for the execution of at least some of the firmware and computer code involved in performing the inventive methods, such as the link initialization operations, implemented in the link firmware 646 shown in FIG. 6. The link firmware 646 may comprise the host 130 and storage controller 132 link firmware described with respect to FIG. 1. In addition, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated. The computer 601 may comprise an implementation of components of the host 100 and storage controller 102 systems in FIG. 1.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer-readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 621 and the other storage media discussed below. The program instructions, and associated data, are accessed by processor set 610 to control and direct performance of the inventive methods. In computing environment 600, at least some of the instructions for performing the inventive methods may be implemented in link firmware 646 in the processor set 610. COMMUNICATION FABRIC 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 646 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer-readable program instructions for performing the inventive methods can typically be downloaded to computer 601 from an external computer or external storage device through a network adapter card or network interface included in network module 615. The network module 615 may comprise the host 106 and storage controller 108 PCIe adaptor cards in FIG. 1.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

CLOUD COMPUTING SERVICES AND/OR MICROSERVICES (not separately shown in FIG. 6): private and public clouds 606 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for initializing a link between a first device and a second device, the computer program product comprising a computer readable storage medium having computer readable program code embodied in the first device and the second device that when executed performs operations, the operations comprising:
    initializing a link initialization memory area in a system memory of the first device;
    providing a bus address in a bus interface mapping to the link initialization memory area;
    writing, by the first device, first initialization data to the bus address to cause the first initialization data to be written to the link initialization memory area;
    writing, by the second device, second initialization data over the bus interface to the bus address to cause the second initialization data to be written to the link initialization memory area; and
    communicating Input/Output (I/O) requests between the first device and the second device over the link in response to the writing of the first initialization data and the second initialization data to the link initialization memory area.

2. The computer program product of claim 1, wherein the computer readable program code in the first device is implemented in first link firmware in the first device, and wherein the computer readable program code in the second device is implemented in second link firmware in the second device.

3. The computer program product of claim 2, wherein the bus interface comprises a Peripheral Component Interconnect Express (PCIe) bus interface implemented in a PCIe card and the first link firmware and the second link firmware are implemented in processor complexes in the first device and the second device, respectively.

4. The computer program product of claim 1, wherein the operations further comprise:
    enabling, by the first device, direct memory access (DMA) to the link initialization memory area; and
    determining, by the second device, whether the DMA is enabled, wherein the second device writes to the link initialization memory area using the DMA in response to the determining that the DMA is enabled.

5. The computer program product of claim 1, wherein the initializing the link initialization memory area comprises:
    configuring a first memory area for the first device in the link initialization memory area for the first device and a second memory area in the link initialization memory area for the second device, wherein the first device writes to the first memory area and reads from the second memory area during the link initialization, and wherein the second device writes to the second memory area and reads from the first memory area during the link initialization.

6. The computer program product of claim 1, wherein the operations further comprise:
    determining, by the first device, whether the second device has written the second initialization data to the link initialization memory area; and
    writing, by the first device, handshake complete for the first device in the link initialization memory area in response to determining that the second device has written the second initialization data to the link initialization memory area.

7. The computer program product of claim 6, wherein the operations further comprise:
    writing, by the second device, data available for the second device in the link initialization memory area in response to writing the second initialization data to the link initialization memory area; and
    determining, by the first device, whether the second device has written the data available to the link initialization memory area, wherein the first device determines whether the second device has written the second initialization data to the link initialization memory area in response to determining that the second device has written data available in the link initialization memory area.

8. The computer program product of claim 6, wherein the operations further comprise:
    writing, by the first device, heartbeat values for the first device in the link initialization memory area in response to determining that the second device has written the second initialization data to the link initialization memory area; and
    writing, by the second device, heartbeat values for the second device in the link initialization memory area in response to determining that the first device has written the first initialization data to the link initialization memory area.

9. The computer program product of claim 1, wherein the first device comprises a host system and the second device comprises a storage controller managing a storage used by the first device to store data.

10. The computer program product of claim 1, wherein the I/O requests comprise synchronous I/O operations between the first device and the second device over the link.

11. A system for initializing a link between a first device and a second device, comprising:
    a processor;
    a system memory accessed by the processor; and
    a computer readable storage medium having computer readable program code embodied in the first device that when executed performs operations, the operations comprising:
        initializing a link initialization memory area in the system memory of the first device;
        providing a bus address in a bus interface mapping to the link initialization memory area;
        writing, by the first device, first initialization data to the bus address to cause the first initialization data to be written to the link initialization memory area;
        receiving second initialization data from the second device over the bus interface to write to the bus address to cause the second initialization data to be written to the link initialization memory area; and
        communicating Input/Output (I/O) requests between the first device and the second device over the link in response to the writing of the first initialization data and the second initialization data to the link initialization memory area.

12. The system of claim 11, wherein the operations further comprise:
    enabling, by the first device, direct memory access (DMA) to the link initialization memory area, wherein the second device determines whether the DMA is enabled, and wherein the second device writes to the link initialization memory area using the DMA in response to the determining that the DMA is enabled.

13. The system of claim 11, wherein the initializing the link initialization memory area comprises:
    configuring a first memory area for the first device in the link initialization memory area for the first device and a second memory area in the link initialization memory area for the second device, wherein the first device writes to the first memory area and reads from the second memory area during the link initialization, and wherein the second device writes to the second memory area and reads from the first memory area during the link initialization.

14. The system of claim 11, wherein the operations further comprise:
    determining, by the first device, whether the second device has written the second initialization data to the link initialization memory area; and
    writing, by the first device, handshake complete for the first device in the link initialization memory area in response to determining that the second device has written the second initialization data to the link initialization memory area.

15. The system of claim 14, wherein the operations further comprise:
    writing, by the second device, data available for the second device in the link initialization memory area in response to writing the second initialization data to the link initialization memory area; and
    determining, by the first device, whether the second device has written the data available to the link initialization memory area, wherein the first device determines whether the second device has written the second initialization data to the link initialization memory area in response to determining that the second device has written data available in the link initialization memory area.

16. A method for initializing a link between a first device and a second device, comprising:
    initializing a link initialization memory area in a system memory of the first device;
    providing a bus address in a bus interface mapping to the link initialization memory area;
    writing, by the first device, first initialization data to the bus address to cause the first initialization data to be written to the link initialization memory area;
    writing, by the second device, second initialization data over the bus interface to the bus address to cause the second initialization data to be written to the link initialization memory area; and
    communicating Input/Output (I/O) requests between the first device and the second device over the link in response to the writing of the first initialization data and the second initialization data to the link initialization memory area.

17. The method of claim 16, further comprising:
    enabling, by the first device, direct memory access (DMA) to the link initialization memory area; and
    determining, by the second device, whether DMA is enabled, wherein the second device writes to the link initialization memory area using DMA in response to the determining that the DMA is enabled.

18. The method of claim 16, wherein the initializing the link initialization memory area comprises:
    configuring a first memory area for the first device in the link initialization memory area for the first device and a second memory area in the link initialization memory area for the second device, wherein the first device writes to the first memory area and reads from the second memory area during the link initialization, and wherein the second device writes to the second memory area and reads from the first memory area during the link initialization.

19. The method of claim 16, further comprising:
    determining, by the first device, whether the second device has written the second initialization data to the link initialization memory area; and
    writing, by the first device, handshake complete for the first device in the link initialization memory area in response to determining that the second device has written the second initialization data to the link initialization memory area.

20. The method of claim 19, further comprising:
    writing, by the second device, data available for the second device in the link initialization memory area in response to writing the second initialization data to the link initialization memory area; and
    determining, by the first device, whether the second device has written the data available to the link initialization memory area, wherein the first device determines whether the second device has written the second initialization data to the link initialization memory area in response to determining that the second device has written data available in the link initialization memory area.

\* \* \* \* \*